United States Patent
Park et al.

(10) Patent No.: US 10,924,730 B2
(45) Date of Patent: Feb. 16, 2021

(54) IMAGE DECODING METHOD AND DEVICE IN IMAGE CODING SYSTEM

(71) Applicant: LG ELECTRONICS INC., Seoul (KR)

(72) Inventors: Naeri Park, Seoul (KR); Jungdong Seo, Seoul (KR); Jaehyun Lim, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/347,422

(22) PCT Filed: Nov. 7, 2016

(86) PCT No.: PCT/KR2016/012740
§ 371 (c)(1),
(2) Date: May 3, 2019

(87) PCT Pub. No.: WO2018/084344
PCT Pub. Date: May 11, 2018

(65) Prior Publication Data
US 2019/0281286 A1    Sep. 12, 2019

(51) Int. Cl.
*H04N 19/117* (2014.01)
*H04N 19/105* (2014.01)
(Continued)

(52) U.S. Cl.
CPC ......... *H04N 19/105* (2014.11); *H04N 19/109* (2014.11); *H04N 19/117* (2014.11);
(Continued)

(58) Field of Classification Search
None
See application file for complete search history.

(56) References Cited

U.S. PATENT DOCUMENTS

| | | | | |
|---|---|---|---|---|
| 7,349,473 B2* | 3/2008 | Hallapuro | ............ | H04N 19/159 |
| | | | | 375/240.12 |
| 8,270,472 B2* | 9/2012 | Lai | ....................... | H04N 19/597 |
| | | | | 375/240.02 |
| 2018/0098089 A1* | 4/2018 | Chen | ..................... | H04N 19/521 |

FOREIGN PATENT DOCUMENTS

KR    10-2011-0113720 A    10/2011
KR    2012-125450 A1    9/2012
(Continued)

OTHER PUBLICATIONS

"Drift analysis and drift reduction for multiresolution hybrid video coding," Signal Processing: Image Communications, 1996 (Year: 1996).*

*Primary Examiner* — Shadan E Haghani
(74) *Attorney, Agent, or Firm* — Dentons US LLP

(57) ABSTRACT

According to the present invention, an image decoding method performed by a decoding device comprises the steps of: generating a first prediction block and a second prediction block of a current block; selecting a prediction block, to which a Wiener filter is to be applied, among the first prediction block and the second prediction block; deriving Wiener filter coefficients of the selected prediction block based on the first prediction block and the second prediction block; filtering the selected prediction block based on the derived Wiener filter coefficients; and generating a reconstructed block of the current block based on the filtered prediction block. According to the present invention, the overall coding efficiency can be improved by minimizing the difference between prediction blocks.

14 Claims, 9 Drawing Sheets

(51) Int. Cl.
*H04N 19/13* (2014.01)
*H04N 19/159* (2014.01)
*H04N 19/176* (2014.01)
*H04N 19/44* (2014.01)
*H04N 19/46* (2014.01)
*H04N 19/172* (2014.01)
*H04N 19/91* (2014.01)
*H04N 19/132* (2014.01)
*H04N 19/86* (2014.01)
*H04N 19/109* (2014.01)

(52) U.S. Cl.
CPC ........... *H04N 19/13* (2014.11); *H04N 19/132* (2014.11); *H04N 19/159* (2014.11); *H04N 19/172* (2014.11); *H04N 19/176* (2014.11); *H04N 19/44* (2014.11); *H04N 19/46* (2014.11); *H04N 19/86* (2014.11); *H04N 19/91* (2014.11)

(56) References Cited

FOREIGN PATENT DOCUMENTS

| | | |
|---|---|---|
| KR | 10-1379189 B1 | 4/2014 |
| KR | 10-2015-0034691 A | 4/2015 |
| KR | 10-1530758 B1 | 7/2015 |
| WO | 2012-125450 A1 | 9/2012 |

\* cited by examiner

IMAGE DECODING METHOD AND DEVICE IN IMAGE CODING SYSTEM

CROSS-REFERENCE TO RELATED APPLICATIONS

This application is the National Stage filing under 35 U.S.C. 371 of International Application No. PCT/KR2016/012740, filed on Nov. 7, 2016, the contents of which are all hereby incorporated by reference herein in their entirety.

BACKGROUND OF THE INVENTION

Field of the Invention

The present invention relates to an image coding technology, and more particularly, to an image decoding method and device in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY OF THE INVENTION

An aspect of the present invention provides a method and a device for increasing image coding efficiency.

Another aspect of the present invention is to provide an inter-prediction method and an inter-prediction device which are based on by-predicted motion information.

Still another aspect of the present invention is to provide a filtering method and a filtering device which minimize the difference between prediction blocks of a current block.

Yet another aspect of the present invention is to provide a method and a device for deriving filtering information about a prediction block of a current block based on information about a neighboring block of the current block.

According to one embodiment of the present invention, there is provided an image decoding method performed by a decoding device. The method includes: generating a first prediction block and a second prediction block of a current block; selecting a prediction block to which a Wiener filter is applied from among the first prediction block and the second prediction block; deriving Wiener filter coefficients for the selected prediction block based on the first prediction block and the second prediction block; filtering the selected prediction block based on the derived Wiener filter coefficients; and generating a reconstructed block of the current block based on the filtered prediction block, wherein the first prediction block is generated by performing inter-prediction based on a reference picture included in reference picture list L0 (list 0), and the second prediction block is generated by performing inter-prediction based on a reference picture included in reference picture list L1 (list 1).

According to another embodiment of the present invention, there is provided a decoding device that performs image decoding. The decoding device includes: a predictor configured to generate a first prediction block and a second prediction block of a current block, the first prediction block being generated by performing inter-prediction based on a reference picture included in reference picture list L0 (list 0), and the second prediction block being generated by performing inter-prediction based on a reference picture included in reference picture list L1 (list 1); a filter configured to select a prediction block to which a Wiener filter is applied from among the first prediction block and the second prediction block, to derive Wiener filter coefficients for the selected prediction block based on the first prediction block and the second prediction block, and to filter the selected prediction block based on the derived Wiener filter coefficients; and an adder configured to generate a reconstructed block of the current block based on the filtered prediction block.

According to still another embodiment of the present invention, there is provided a video encoding method performed by an encoding device. The method includes: generating a first prediction block and a second prediction block of a current block; selecting a prediction block to which a Wiener filter is applied from among the first prediction block and the second prediction block; deriving Wiener filter coefficients for the selected prediction block based on the first prediction block and the second prediction block; filtering the selected prediction block based on the derived Wiener filter coefficients; and generating, encoding, and outputting prediction-related information and filtering information about the current block, wherein the first prediction block is generated by performing inter-prediction based on a reference picture included in reference picture list L0 (list 0), and the second prediction block is generated by performing inter-prediction based on a reference picture included in reference picture list L1 (list 1).

According to yet another embodiment of the present invention, there is provided a video encoding device. The encoding device includes: a predictor configured to generate a first prediction block and a second prediction block of a current block, the first prediction block being generated by performing inter-prediction based on a reference picture included in reference picture list L0 (list 0), and the second prediction block being generated by performing inter-prediction based on a reference picture included in reference picture list L1 (list 1); a filter configured to select a prediction block to which a Wiener filter is applied from among the first prediction block and the second prediction block, to derive Wiener filter coefficients for the selected prediction block based on the first prediction block and the second prediction block, and to filter the selected prediction block based on the derived Wiener filter coefficients; and an entropy encoder configured to generate, encode, and output prediction-related information and filtering information about the current block.

According to the present invention, it is possible to reduce the amount of data for a residual signal for a current block by minimizing the difference between prediction blocks derived based on bi-predicted motion information, thus improving overall coding efficiency.

Further, according to the present invention, since filtering information can be derived based on information about a neighboring block, additional information about filtering information can be reduced, thereby improving overall coding efficiency.

DESCRIPTION OF EXEMPLARY EMBODIMENTS

Figure 1:
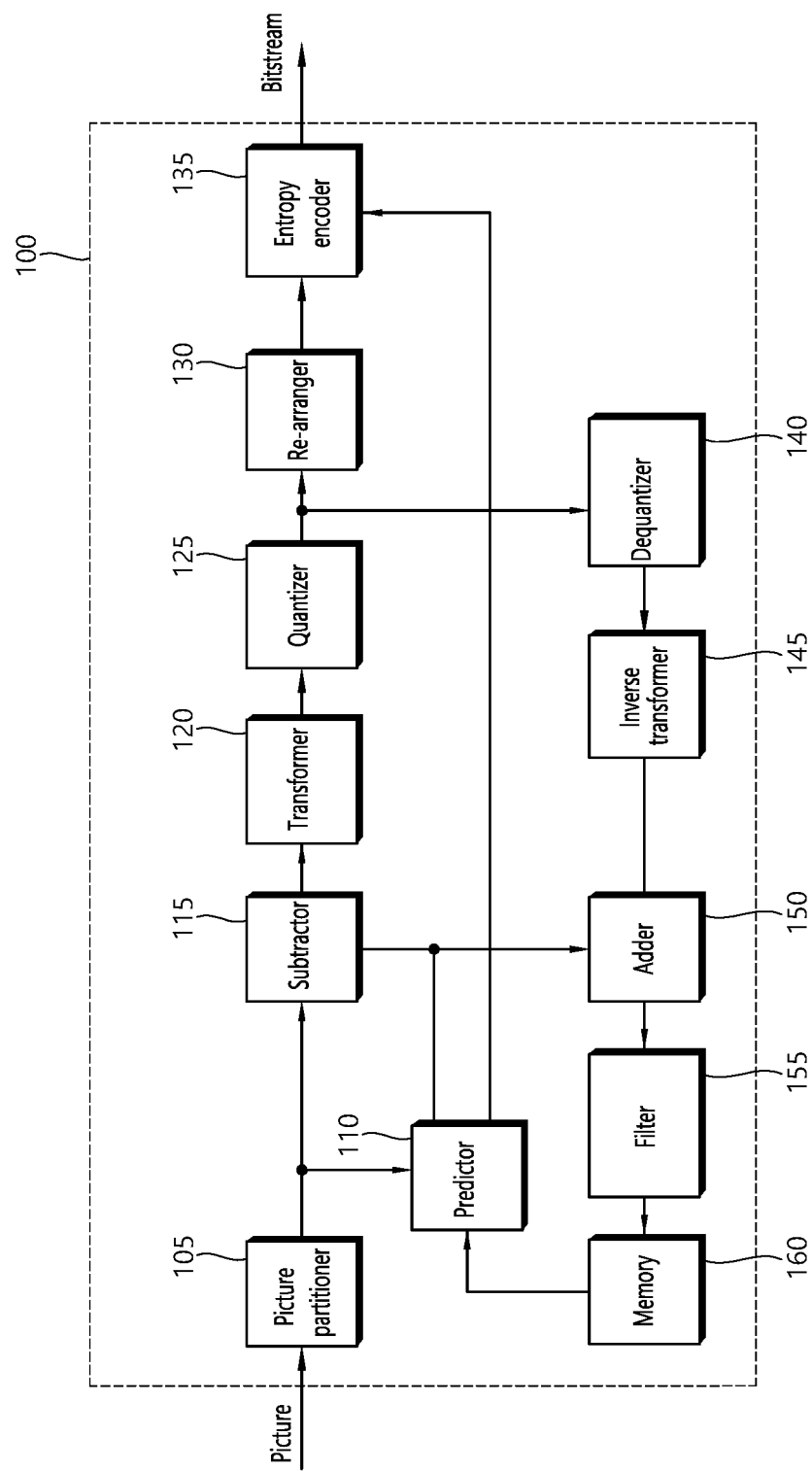
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 schematically illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a coding tree unit (CTU) or a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficient. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. The DPB may store the reconstructed picture. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
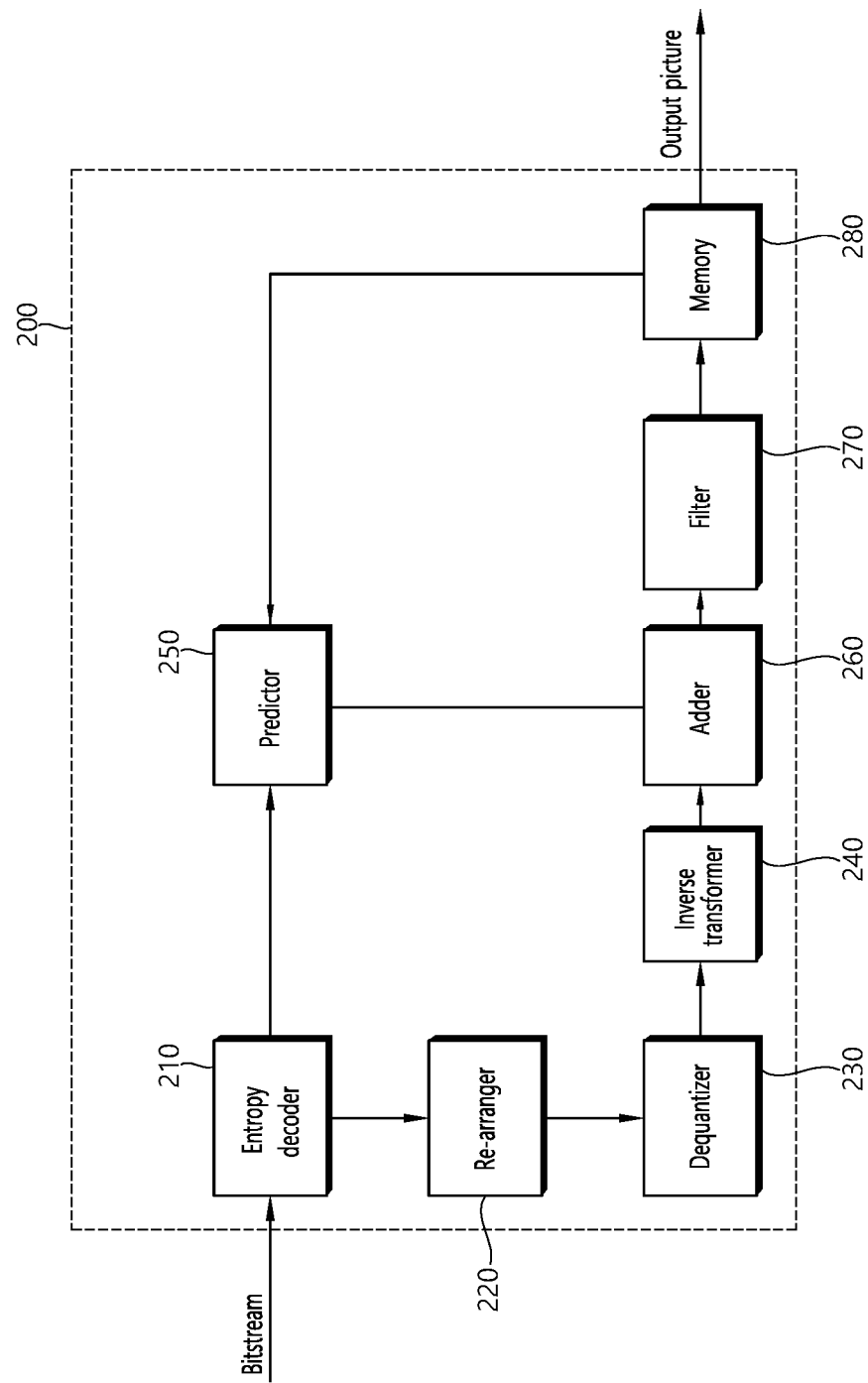
FIG. 2 is a schematic diagram illustrating a configuration of a video decoding device to which the present invention is applicable.

FIG. 2 schematically illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

When inter-prediction is applied to a current block, coding efficiency may be improved by increasing prediction accuracy and thus reducing the data amount of a residual signal. To increase prediction accuracy, a method of applying an adaptive loop filter (ALF) in blocks rather than in pictures may be used. That is, a Wiener filter coefficient for a prediction block may be derived by applying a Wiener filter based on an original block and the prediction block of a current block, and the prediction block may be filtered. However, when the Wiener filter coefficient is derived and encoded in blocks, the data amount of additional information about the Wiener filter coefficient increases, which may reduce coding efficiency.

Accordingly, methods for a decoding device to derive a Wiener filter coefficient without additional information about the Wiener filter coefficient are provided, which may include a method of deriving a Wiener filter coefficient based on a reconstructed block of a neighboring block adjacent to a current block and a prediction block of the neighboring block instead of an original block and a prediction block of the current block. This method may be referred to as adaptive prediction block filtering (APBF). However, APBF uses information about a neighboring block and thus is somewhat inaccurate in improving the prediction accuracy of a current block. The present invention proposes a method in which, when an inter-prediction mode for a current block is applied based on bi-predicted motion information, a Wiener filter coefficient that minimizes an error between two prediction blocks of the current block is derived and is applied to one of the two prediction blocks. When the inter-prediction mode is applied to the current block based on the bi-predicted motion information, the two prediction blocks of the current block may have very close values, in which filtering may be performed so that the residual value between the prediction blocks is minimized, thereby improving coding efficiency.

Figure 3:
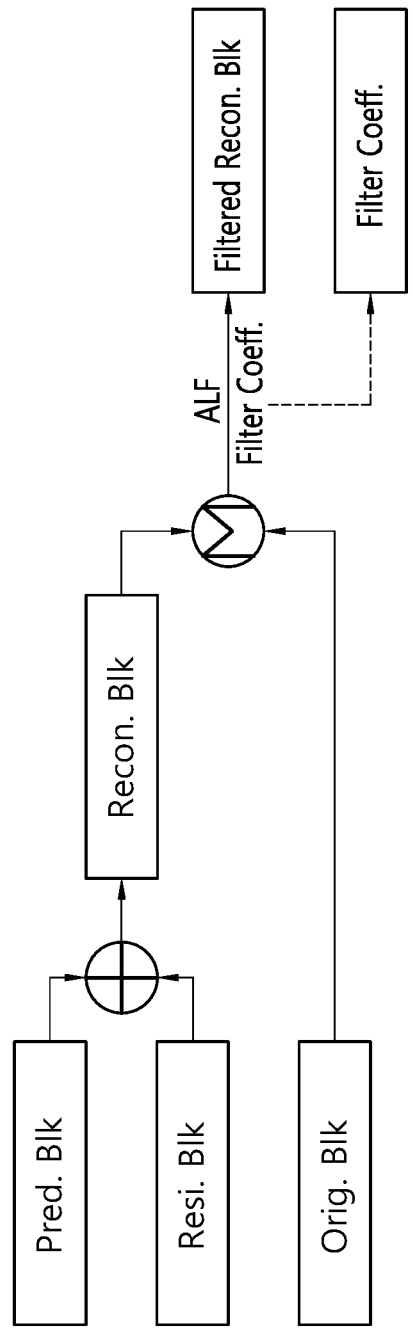
FIG. 3 schematically illustrates an example of a method of applying an adaptive loop filter (ALF).

FIG. 3 schematically illustrates an example of a method of applying an adaptive loop filter (ALF). Referring to FIG. 3, a Wiener filter coefficient is derived using a reconstructed block of a current block and an original block of the current block, and the reconstructed block is filtered based on the derived Wiener filter coefficient, thereby generating a filtered reconstructed block. When the ALF is applied, an encoding device may generate, encode, and output the Wiener filter coefficient in pictures the Wiener filter coefficient. Since the ALF filters the reconstructed block of the current block, the data amount of a residual signal of a current picture cannot be reduced. Instead, a filtered reconstructed picture is used as a reference picture for a picture to be decoded after the current picture is decoded, thereby improving coding efficiency.

Unlike using the ALF, a Wiener filter coefficient for a prediction block is derived based on the original block and the prediction block of the current block, and the prediction block is filtered based on the Wiener filter coefficient, thereby improving accuracy in predicting the predication block and thus reducing the data amount of a residual signal of the current block. This filtering method may be referred to as prediction block filtering (PBF).

Figure 4:
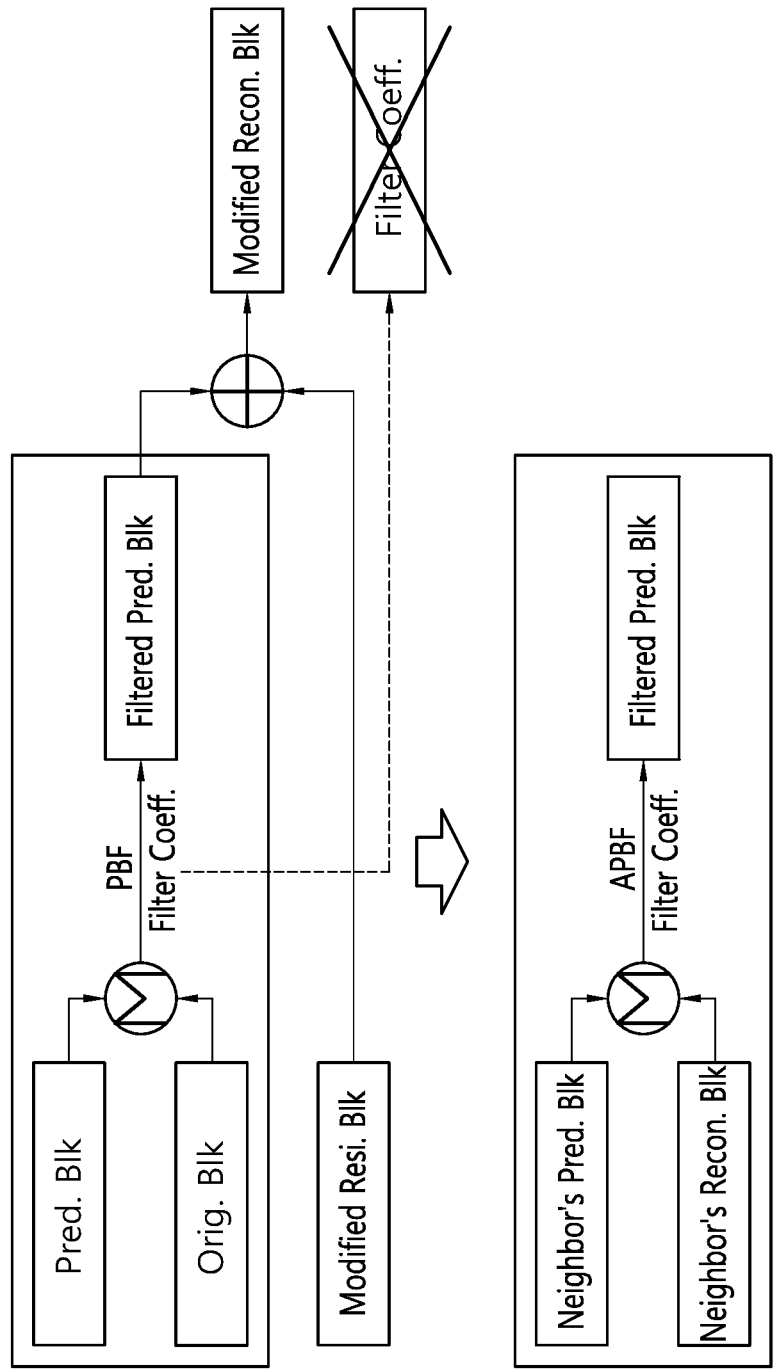
FIG. 4 schematically illustrates an example of a method of applying PBF and APBF.

FIG. 4 schematically illustrates an example of a method of applying PBF and APBF. Referring to FIG. 4, when applying PBF, a Wiener filter coefficient for a prediction block may be derived based on the prediction block and an original block of a current block, and the prediction block may be filtered based on the Wiener filter coefficient, thereby deriving a filtered prediction block. When PBF is applied to the current block, an encoding device may generate, encode, and output the Wiener filter coefficients in blocks. When the Wiener filter coefficient is generated in blocks, the data amount of additional information about the Wiener filter coefficient may increase, thus reducing coding efficiency. Therefore, this method may be unsuitable to be applied to an image coding method.

To derive the Wiener filter coefficient without transmitting the additional information, a decoding device needs to replace the original block of the current block which is not present in the decoding device. To this end, the decoding device may derive the Wiener filter coefficient for the prediction block of the current block based on a reconstructed block of a neighboring block of the current block and a prediction block of the neighboring block, instead of the original block of the current block and the prediction block of the current block. The Wiener filter coefficient may be derived by the following equation.

$$C = \arg\min_C E\left[\left(R_{x,y} - \sum_{i,j=-N}^{N} c_{i,j} \cdot P_{x+i,y+j}\right)^2\right] \quad \text{[Equation 1]}$$

Here, C denotes the Wiener filter coefficient, $R_{x,y}$ denotes a reconstructed sample at the coordinates (x, y) in the reconstructed block of the neighboring block, $c_{i,j}$ denotes a Wiener filter coefficient for the coordinates (i, j) among the Wiener filter coefficients, and $P_{x+i,y+j}$ denotes a prediction sample at the coordinates (x+i, y+j) in the prediction block of the neighboring block. When APBF is applied, the Wiener filter coefficient may be derived by the above equation without transmitting the additional information about the Wiener filter coefficient. However, the Wiener filter coefficient is derived based on information about the neighboring block, instead of information about the current block, there is a limit in improving the prediction accuracy of the prediction block of the current block. Therefore, a Wiener filter coefficient may be derived based on two prediction blocks generated by inter-prediction based on bi-predicted motion information about the current block in order to derive the Wiener filter coefficient from the information about the current block, and filtering may be performed based on the Wiener filter coefficient, thereby improving the prediction accuracy of the prediction block of the current block. The bi-predicted motion information may include an L0 reference picture index, a motion vector associated with a reference picture included in L0, an L1 reference picture index, and a motion vector associated with a reference picture included in L1. L0 indicates reference picture list L0 (list 0), and L1 indicates a reference picture list L1 (list 1). The two prediction blocks may include prediction block P0 (prediction block 0) generated based on a reference picture included in reference picture list L0 and prediction block P1 (prediction block 1) generated based on a reference picture included in reference picture list L1. A method of deriving a Wiener filter coefficients based on P0 and P1 may be referred to as bi-prediction block filtering (BPBF).

Assuming that the prediction blocks generated based on the bi-predicted motion information have the same sample value, P0 and P1 need to have the same sample value, and the smaller a difference between samples according to the phase of P0 and P1, that is, a residual value, is, the smaller an error in predicting the current block is. Accordingly, the prediction accuracy of the prediction block of the current block may be improved, which may reduce the data amount of a residual signal of the current block, thereby improving overall coding efficiency.

Figure 5:
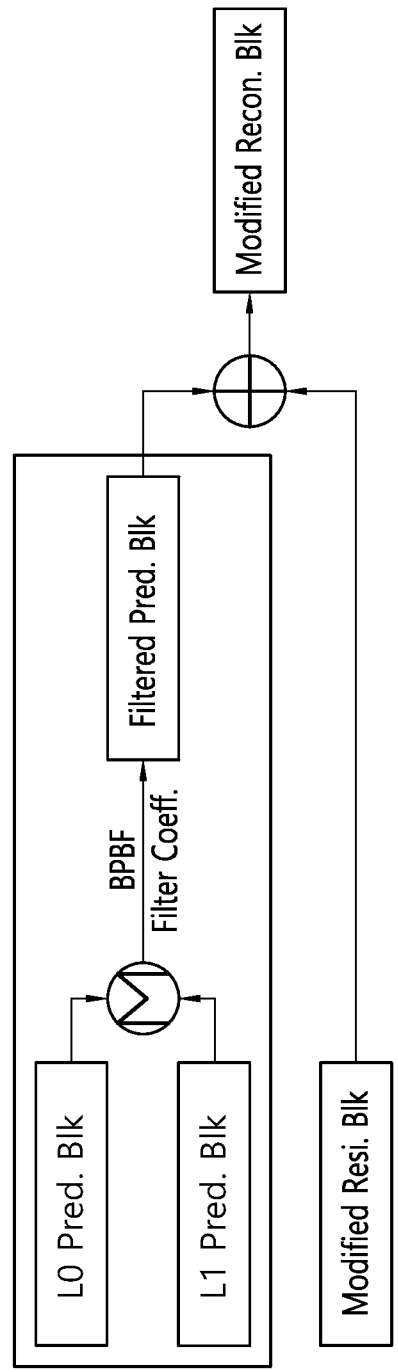
FIG. 5 illustrates an example of a method of applying BPBF.

FIG. 5 illustrates an example of a method of applying BPBF. Referring to FIG. 5, in APBF, a Wiener filter coefficient for P1 of a current block may be derived based on P0 of the current block, rather than a reconstructed block of a neighboring block, and P1 of the current block, rather than a prediction block of the neighboring block, and the Wiener filter coefficient may be applied to P1. Alternatively, in APBF, a Wiener filter coefficient for P0 of the current block may be derived based on P1 of the current block, rather than the reconstructed block of the neighboring block, and P0 of the current block, rather than the prediction block of the neighboring block, and the Wiener filter coefficient may be applied to P0.

To select a prediction block to be filtered, an encoding device may transmit information about filtering in blocks, and the information about filtering may include a flag indicating whether filtering is performed and an index indicating a prediction block to be filtered. The flag may be referred to as a BPBF flag, and the index may be referred to as a BPBF index. That is, the BPBF flag may indicate whether BPBF is on/off for the current block, that is, whether BPBF is applied/is not applied, and the BPBF index may indicate whether to filter P0 of the current block or to filter P1 of the current block. The BPBF flag and the BPBF index may be indicated through separate syntax elements or may be indicated through a single syntax element. For example, a syntax element value of 0 may indicate the BPBF-off state of the current block, 10 may indicate that the current block is in the BPBF-on state and a Wiener filter coefficient is applied to P0, and 11 may indicate that the current block is in the BPBF-on state and a Wiener filter coefficient is applied to P1.

In order to reduce compression loss due to additional information about the BPBF flag and the BPBF index, that is, the data amount of the additional information, it is possible to transmit and receive different additional information about the BPBF flag and the BPBF index separately depending on an advanced motion vector prediction (AMVP) mode and a merge mode among the inter-prediction modes.

Figure 6:
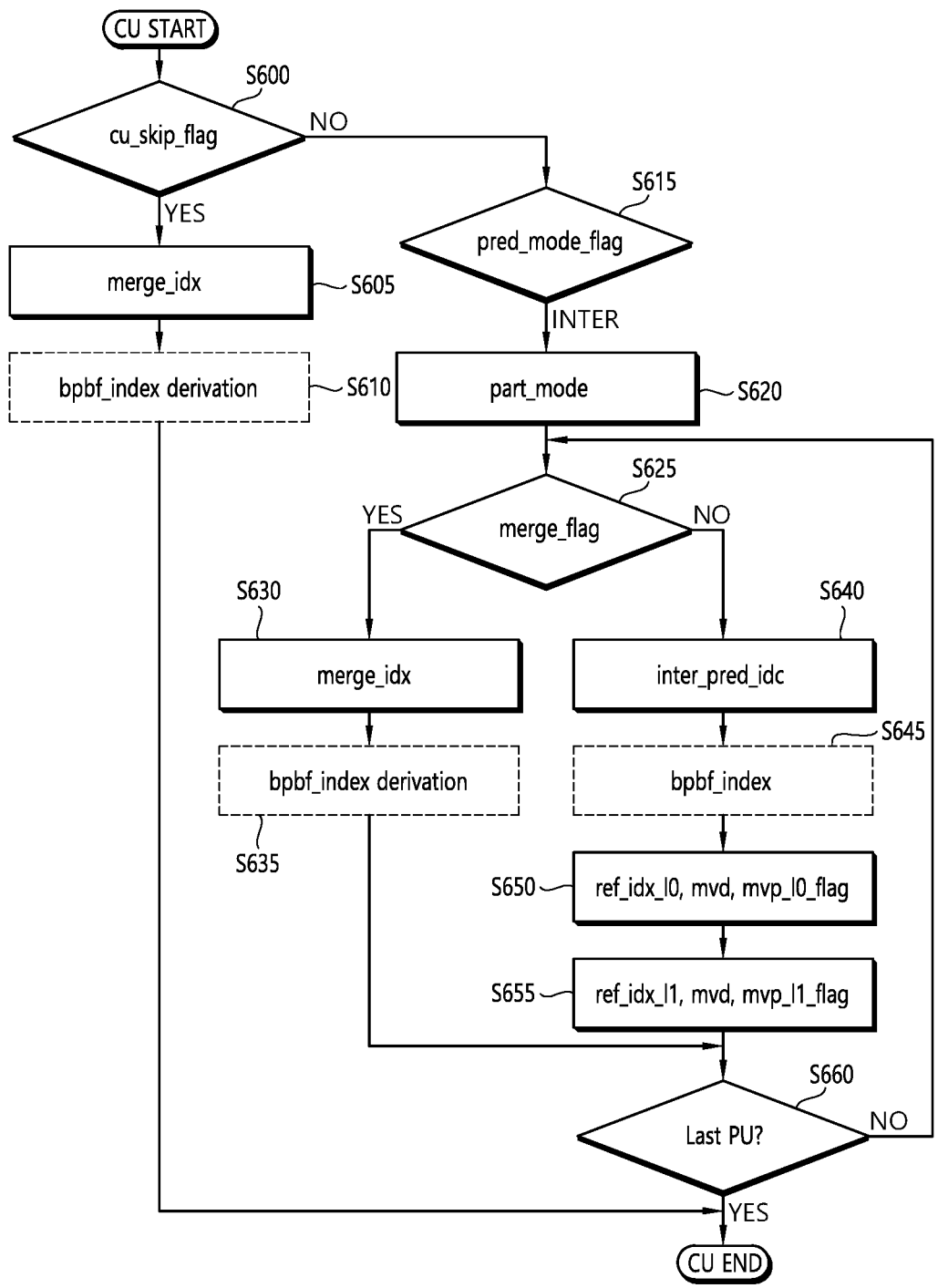
FIG. 6 illustrates an example of a method of transmitting a BPBF index according to the mode in a process of decoding a current block.

FIG. 6 illustrates an example of a method of transmitting a BPBF index according to the mode in a process of decoding a current block. Here, the current block may correspond to a CU or may correspond to a PU.

Referring to FIG. 6, a decoding device parses and identifies cu_skip_flag from a received bitstream (S600). cu_skip_flag indicates whether to apply a skip mode. If the value of cu_skip_flag is 1, the skip mode is applied. If the value of cu_skip_flag is 0, the skip mode is not applied. If the skip mode is applied, residual information about the current block may not be signaled, and a prediction sample for the current block may be used as a reconstructed sample.

If the value of cu_skip_flag is 1 in step S600, the decoding device parses and identifies merge_idx (S605). The decoding device may derive a BPBF index for the current block based on the BPBF index of a neighboring block indicated by merge_idx among neighboring blocks included in a merge candidate list configured based on neighboring blocks of the current block (S610). For example, the decoding device may apply the BPBF index of the neighboring block indicated by merge_idx intactly as the BPBF index of the current block.

If the value of cu_skip_flag is 0 in step S600, the decoding device parses and identifies pred_mode_flag (S615). pred_mode_flag indicates whether an inter-prediction mode or an intra-prediction mode is applied to the current block. For example, if the value of pred_mode_flag is 0, the inter-prediction mode may be applied to the current block. If the value of pred_mode_flag is 1, the intra-prediction mode may be applied to the current block.

If the value of pred_mode_flag is 0 in step S615, the decoding device parses and identifies part_mode, and partitions the current block into prediction blocks based on part_mode (S620). part_mode indicates the partitioning structure of the current block. If the current block has a 2N×2N size, the decoding device may partition the current block into 2N×2N, 2N×N, N×2N, N×N, 2N×nU, 2N×nD, nL×2N, and nR×2N prediction blocks based on the value of part_mode.

The decoding device parses and identifies merge_flag (S625). merge_flag may indicate whether a merge mode is applied to the current block. For example, if the value of merge_flag is 1, the merge mode is applied to the current block. If the value of merge_flag is 0, the merge mode is not applied to the current block.

If the value of merge_flag is 1 in step S625, the decoding device parses and identifies merge_idx (S630). The decoding device may derive a BPBF index for the current block based on the BPBF index of a neighboring block indicated by merge_idx among neighboring blocks included in a merge candidate list configured based on neighboring blocks of the current block (S635). For example, the decoding device may apply the BPBF index of the neighboring block indicated by merge_idx intactly as the BPBF index of the current block.

If the value of merge_flag is 0 in step S625, the AMVP mode is applied and the decoding device parses and identifes inter_pred_idc (S640). inter_pred_idc may indicated whether uni-prediction based on L0 motion information, uni-prediction based on L1 motion information, or bi-prediction based on the L0 motion information and the L1 motion information is applied to the current block. Here, the L0 motion information may indicate motion information about reference picture list L0, and the L1 motion information may indicate motion information about reference picture list L1. When uni-prediction based on the L0 motion information is applied to the current block, the decoding device may perform only step S650 to be described below. When uni-prediction based on the L1 motion information is applied to the current block, the decoding device may perform only step S655 to be described below. When bi-prediction based on the L0 motion information and the L1 motion information is applied to the current block, the decoding device may perform both step S650 and step S655.

The decoding device parses and identifies bpbf_index (S645). bpbf_index may indicated by a syntax element indicating the BPBF index of the current block. The decoding device may derive a prediction block to which a Wiener filter of BPBF is applied among P0 and P1 of the current block based on the BPBF index.

If the value of inter_pred_idc indicates uni-prediction based on the L0 motion information or bi-prediction based on the L0 motion information and the L1 motion information in step S640, the decoding device parses and identifies ref_idx_l0, a motion vector difference (mvd), and mvp_l0_flag (S650). ref_idx_l0 may indicate one reference picture for the current block among reference pictures included in L0, and the mvd may indicate a motion vector difference between the motion vector of the current block and a motion vector predictor. The decoding device may derive an L0 motion vector predictor of the current block based on the motion vector of a neighboring block indicated by mvp_l0_flag among neighboring blocks included in a candidate list configured based on the neighboring blocks of the current block.

If the value of inter_pred_idc indicates uni-prediction based on the L1 motion information or bi-prediction based on the L0 motion information and the L1 motion information in step S640, the decoding device parses and identifies ref_idx_l1, a mvd, and mvp_l1_flag (S655). ref_idx_l1 may indicate one reference picture for the current block among reference pictures included in L1, and the mvd may indicate a motion vector difference between the motion vector of the current block and the motion vector predictor. The decoding device may derive an L1 motion vector predictor of the current block based on the motion vector of a neighboring block indicated by mvp_l1_flag among the neighboring blocks included in the candidate list configured based on the neighboring blocks of the current block.

The decoding device identifies whether the prediction block subjected to the foregoing decoding process is the last prediction block of the current block. If the prediction block subjected to the foregoing decoding process is the last prediction block of the current block, the decoding device may terminate the decoding process for the current block. If the prediction block subjected to the foregoing decoding process is not the last prediction block of the current block, the decoding device may perform the decoding process on a prediction block following the prediction block subjected to the foregoing decoding process among the prediction blocks of the current block according to the decoding order.

Figure 7:
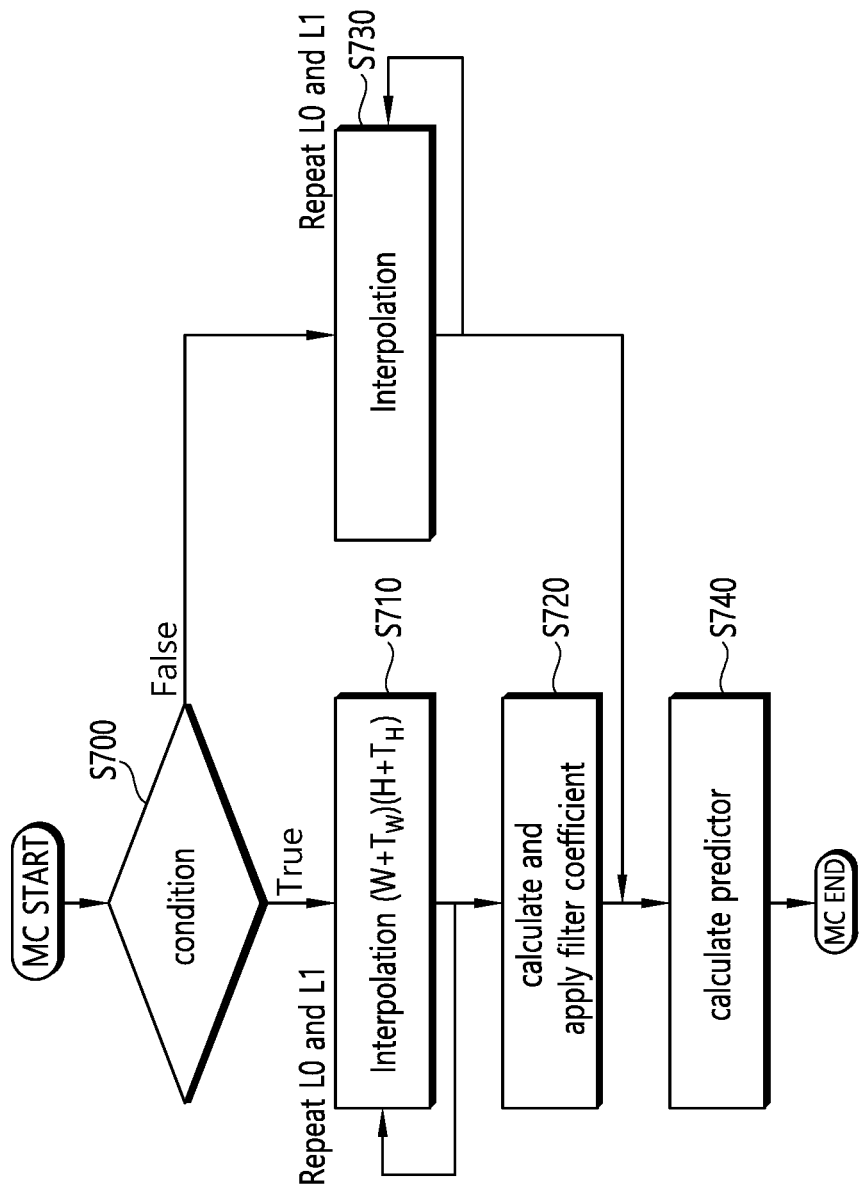
FIG. 7 illustrates an example of a motion compensation process in an inter-prediction mode in which BPBF is applied.

FIG. 7 illustrates an example of a motion compensation process in an inter-prediction mode in which BPBF is applied. The method illustrated in FIG. 7 may be performed by a coding device, which may include an encoding device or a decoding device. Referring to FIG. 7, when BPBF is applied, the decoding device may calculate a Wiener filter coefficient based on P0 and P1, which are prediction blocks derived using bi-predicted motion information in the motion compensation process, and may apply the Wiener filter coefficient P0 or P1 according to the BPBF index.

Referring to FIG. 7, the coding device determines whether a predefined condition is satisfied (S700). The condition may include the picture order count (POC) of a reference picture in reference picture list L0 associated with P0 and the POC of a reference picture in reference picture list L1 associated with P0 are in different directions with respect to a POC of a current picture. The POC of a reference picture having a smaller value than the POC of the current picture may be represented by "forward", and the POC of a reference picture having a larger value than the POC of the current picture may be represented by "backward". Also, step S700 is provided for illustrative purposes and may be omitted. That is, unlike in FIG. 7, a motion compensation process according to the present invention may be performed without the step of determining whether the condition is satisfied.

If the condition is satisfied in S700, the coding device performs an interpolation procedure (S710). If a current block has a W×H size, the coding device may perform the interpolation procedure for an area with a $(W+T_W)\times(H+T_H)$ size in view of filtering for the W×H current block according to the present invention. Here, $T_W$ and $T_H$ may be derived based on the number of filter taps. For example, $T_W$ may be a value derived from the number of width filter taps, and $T_H$ may be a value derived from the number of height filter taps. The interpolation may be performed when the motion vector of the current block indicates the position of an integer sample and indicates to the position of a fractional sample. That is, the interpolation may include not only interpolation for fractional samples but also copying or padding for integer samples.

For example, if a filter has a 5×5 size, $T_W$ and $T_H$ may be derived by $(5>>1)<<1$ and may have a value of 4. In this case, an interpolated area for the current block may include an additional area by 2 from the upper, lower, right, and left boundaries of the current block. Alternatively, when a filter is not a square type, that is, when the number of the width taps and the number of height taps are different, $T_W$ and $T_H$ may be derived as different values.

The coding device derives bi-prediction blocks of the current block, P0 and P1, based on the interpolated area, derives a Wiener filter coefficient for a prediction block selected from among P0 and P1, and applies the Wiener filter coefficient to the prediction block (S720). The coding device may derive a Wiener filter coefficient for one of the prediction blocks P0 and P1 based on P0 and P1 of the current block and may apply the derived Wiener filter coefficient to the one prediction block, thereby obtaining a filtered prediction block. The coding device may derive the Wiener filter coefficient by Equation 1 illustrated above.

If the condition is not satisfied in step S700, the coding device performs an interpolation procedure (S730). P0 and P1 of the current block may be derived based on the interpolated area.

The coding device generates a (final) prediction block (S740). If the filtered prediction block is derived in step (S720), the coding device may derive the filtered prediction block as a (final) prediction block of the current block. In addition, when the bi-prediction blocks P0 and P1 of the current block are derived in step S730, the coding device may derive a (final) prediction block based on the average sum or the weight sum of the prediction blocks.

When the merge mode among the inter-prediction modes is applied to a current block, an encoding device may signal information about BPBF for the current block, which will be described later. When the merge mode is applied, the encoding device may also transmit a BPBF index as in FIG. 7 where the AMVP mode is applied and may apply optimal BPBF to the current block. Specific methods for transmitting the BPBF index when the merge mode is applied to the current block are illustrated below.

For example, when the merge mode is applied to the current block, it may be identified through a bitstream whether an inter-prediction mode for the current block is performed based on bi-predicted motion information in a process of decoding the current block rather than in a process of parsing information about the current block. Therefore, unlike in the AMVP mode where information about the BPBF index is parsed only when an inter-prediction mode for the current block is performed based on bi-predicted motion information, when the merge mode is applied to the current block, the encoding device may always transmit the BPBF index.

In another example, when the AMVP mode is applied to the current block, the encoding device may transmit the BPBF flag and the BPBF index through one syntax element. When the merge mode is applied to the current block, the encoding device may transmit the BPBF flag so that a decoding device may determine only the BPBF-on/off state of the current block and may select a prediction block to be filtered among P0 and P1 of the current block based on information about a neighboring block of the current block.

When the decoding device selects a prediction block to be filtered in a process of decoding the current block, the following methods may be applied.

For example, when the skip mode or the merge mode is applied to the current block, the decoding device may obtain a merge index for the current block through a bitstream and may apply the BPBF index of a neighboring block of the current block, which is indicated by the merge index and is included in a merge candidate list, intactly to the current block. That is, the decoding device may derive, as a prediction block to which a Wiener filter is applied, a prediction block of an index indicated by the BPBF index of the neighboring block indicated by the merge index among P0 and P1 of the current block.

Further, when the skip mode or the merge mode is applied to the current block, the decoding device may apply the BPBF index of a block, which is not 0, among merge candidate blocks included in the merge candidate list to the current block. That is, the decoding device may derive a neighboring block having a BPBF index which is not 0 among the merge candidate blocks included in the merge candidate list and may derive a prediction block determined according to the value of the BPBF index of the neighboring block from among P0 and P1 of the current block as a prediction block to which a Wiener filter is applied.

In addition, when the skip mode or the merge mode is applied to the current block, the decoding device may determine whether the value of the BPBF index of a left neighboring block of the current block among the merge candidate blocks included in the merge candidate list is the same as the value of the BPBF index of an upper neighboring block of the current block, and may apply the BPBF index of the left neighboring block to the current block if the value of the BPBF index of the left neighboring block is the same as the value of the BPBF index of the upper neighboring block. That is, if the value of the BPBF index of the left neighboring block is the same as the value of the BPBF index of the upper neighboring block, the decoding device may derive a prediction block determined according to the value of the BPBF index of the left neighboring block from among P0 and P1 of the current block as a prediction block to which a Wiener filter is applied.

If the merge mode is applied to the current block, the encoding device transmits the BPBF index so that the decoding device may select a prediction block to be filtered among P0 and P1 of the current block based on the BPBF index and may determine the BPBF-on/off state of the current block based on information about a neighboring block of the current block.

When the decoding device determines whether to apply BPBF to the current block in the process of decoding the current block, the following methods may be applied.

For example, when the skip mode or the merge mode is applied to the current block, the decoding device may obtain a merge index for the current block through a bitstream and may apply the BPBF flag of a neighboring block of the current block, which is indicated by the merge index and is included in a merge candidate list, intactly to the current block. That is, the decoding device may determine whether to apply BPBF to the current block based on the BPBF flag of the neighboring block indicated by the merge index. Specifically, if the value of the BPBF flag is 1, the decoding device may determine that filtering is performed on one prediction block among P0 and P1 of the current block.

When the skip mode or the merge mode is applied to the current block, the decoding device may determine that the current block is in the BPBF-on state when there is at least one merge candidate block having a BPBF flag value indicating the BPBF-on state among the merge candidate blocks included in the merge candidate list. That is, if the merge candidate list includes at least one neighboring block having a BPBF flag value of 1, the decoding device may determine that filtering is performed on one prediction block among P0 and P1 of the current block.

When the skip mode or the merge mode is applied to the current block, the decoding device may determine whether the value of the BPBF flag of the left neighboring block of the current block among the merge candidate blocks included in the merge candidate list is the same as the value of the BPBF flag of the upper neighboring block of the current block, and may apply the BPBF flag of the left neighboring block to the current block if the value of the BPBF flag of the left neighboring block is the same as the value of the BPBF flag of the upper neighboring block. That is, if the value of the BPBF flag of the left neighboring block is the same as the value of the BPBF flag of the upper neighboring block and the value of the BPBF flag of the left neighboring block is 1, the decoding device may determine that filtering is performed on one prediction block among P0 and P1 of the current block. Otherwise, the decoding device may determine that the current block is in the BPBF-off state.

The decoding device may apply BPBF to the current block without transmitting additional information about the BPBF flag and the BPBF index for the current block. For example, the decoding device may determine whether to apply BPBF to the current block based on the sum of absolute differences (SAD) between samples of P0 and P1 of the current block according to the phase. Specifically, when the sum of absolute differences is greater than threshold value 1, which does not correspond to the assumption that P0 and P1 are the same, the decoding decode may determine that BPBF is not applied to the current block. This method of determining whether to apply BPBF to the current block based on the sum of absolute differences between the samples of P0 and P1 according to the phase may be applied when one of the AMVP mode and the merge mode is applied to the current block, when the AMVP mode is applied to the current block, and when the merge mode is applied to the current block.

Further, it is possible to determine whether to apply BPBF in samples within the current block according to the change in not only the threshold value in blocks illustrated above but also the threshold value in samples and the sample value in samples. In this case, when the amount of change in a particular neighboring area having a specific size of a current sample in the current block is greater than particular threshold value 2, the decoding device may determine that BPBF is not applied to the sample. Specifically, based on a particular neighboring area having a 5×5 size of the current sample, when the sum of absolute differences between the sample values of samples corresponding to a particular area in P0 of the current block and the sample values of samples corresponding to a particular area in P1 of the current block is greater than particular threshold value 2, the decoding device may determined that BPBF is not applied to the sample.

In addition, it is possible to apply BPBF to the current block in view of not only the change in the sample value of the block but also various characteristics of a block. For example, if the size of the current block is greater than 16×16, BPBF may be applied to the current block. If the size of the current block is equal to or smaller than 16×16, BPBF may not be applied to the current block.

Moreover, different shapes of Wiener filters may be applied in view of the change in the sample value of the current block or the characteristics of the current block. A method of applying BPBF to the current block may be performed depending on the size of the current block and the shape of the current block. Different shapes of Wiener filters of BPBF may be applied to the current block depending on whether the current block is square or non-square or in view of the aspect ratio of the current block. For example, if the size of the current block is greater than 32×32 and the shape of the current block is square, the size of a Wiener filter for the current block may be derived as 7×5 or 5×7. If the size of the current block is equal to or smaller than 32×32 and the shape of the current block is square, the size of a Wiener filter for the current block may be derived as 5×5. If the size of the current block is equal to or smaller than 32×32 and the shape of the current block is non-square, the size of a Wiener filter for the current block may be derived as 5×3 or 3×5. This method is illustrated only as a specific example, and the decoding device may employ examples of deriving various types of filters other than the foregoing examples according to the size of the current block, whether the shape of the current block is square or non-square, and the change in the sample value of the current block.

Figure 8:
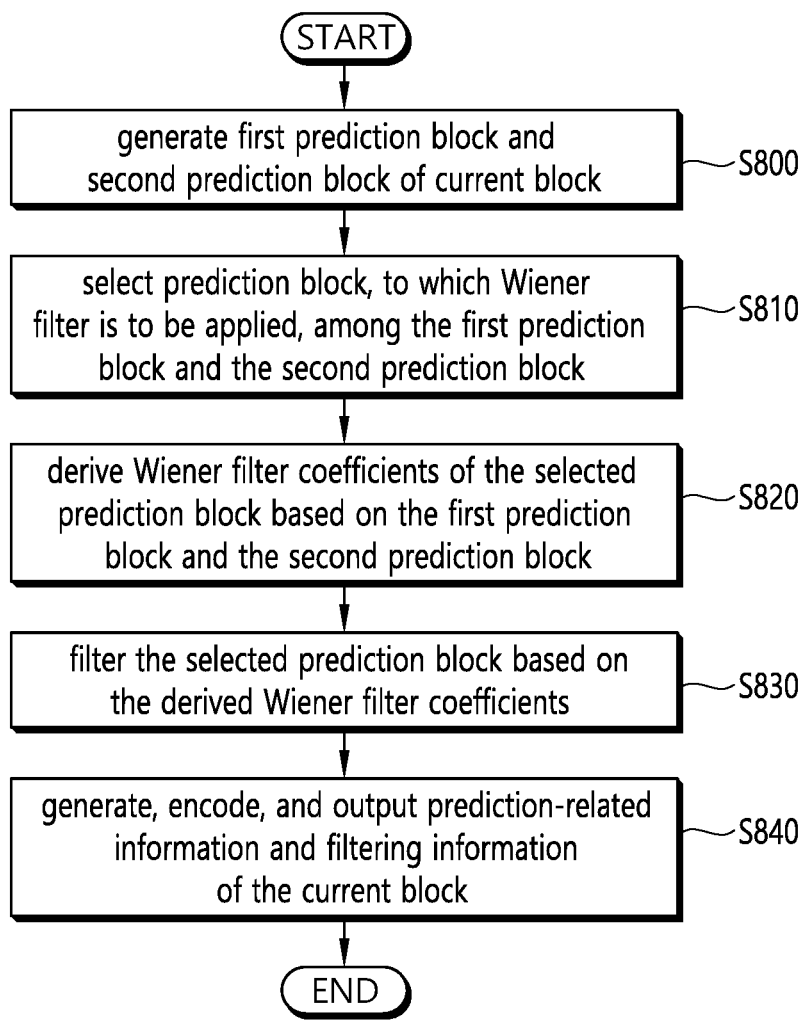
FIG. 8 schematically illustrates a video encoding method by an encoding device according to the present invention.

FIG. 8 schematically illustrates a video encoding method by an encoding device according to the present invention. The method disclosed in FIG. 8 may be performed by the encoding device disclosed in FIG. 1. For example, S800 in FIG. 8 may be performed by the predictor of the encoding device, S810 to S830 may be performed by the filter of the encoding device, and S840 may be performed by the entropy encoder of the encoding device.

The encoding device generates a first prediction block and a second prediction block of a current block (S800). The encoding device may generate the first prediction block and the second prediction block of the current block. The encoding device may derive an optimal motion vector through motion estimation of the current block, may find a reference block in a reference picture reconstructed based on the derived motion vector for the current block, and may generate a prediction block of the current block based on the reference block. The reference picture may be a reference picture included in reference picture list L0 (list 0) or a reference picture included in reference picture list L1 (list 1). The first prediction block may be generated by performing inter-prediction based on the reference picture included in reference picture list L0, and the second prediction block may be generated by performing inter-prediction based on the reference picture included in reference picture list L1.

The encoding device selects a prediction block to which a Wiener filter is applied from among the first prediction block and the second prediction block (S810). The encoding device may derive a Wiener filter coefficient for one of the first prediction block and the second prediction block based on the first prediction block and the second prediction block of the current block and may filter the one prediction block based on the derived Wiener filter coefficient. This filtering may be referred to as bi-prediction block filtering (BPBF). The encoding device may determine whether to apply BPBF to the current block by comparing coding efficiency in the case of filtering the first prediction block with that in the case of filtering the second prediction block. When BPBF is applied to the current block, a prediction block to which the Wiener filter is applied may be selected from among the first prediction block and the second prediction block.

Also, the encoding device may determine whether to apply BPBF to the current block based on the sum of absolute differences (SAD) between samples of the first prediction block and the second prediction block of the current block according to the phase. Specifically, when the sum of absolute differences is greater than a specific threshold value, the encoding device may determine not to perform filtering on one of the first prediction block and the second prediction block.

Further, the encoding device may determine whether to apply BPBF in samples in the current block according to the change in the sample value in samples. The encoding device may derive a first region of the first prediction block and may derive a second region of the second prediction block corresponding to the first region. The first region may be included in the first prediction block and may be a region with a specific size including a current sample for determining whether to apply BPBF. For example, the first region may be derived as a 5×5 region including the current sample. The encoding device may derive the sum of absolute differences between samples of the first region and the second region according to the phase and may determine whether to filter one of the first region and the second region based on the sum of absolute differences and a specific threshold value. If the sum of absolute differences is greater than the specific threshold value, the encoding device may determine not to perform filtering on one of the first region and the second region.

In addition, the encoding device may determine whether to apply BPBF to the current block in view of not only the change in the sample values of the first prediction block and the second prediction block but also various characteristics of a block. For example, if the size of the current block is greater than 16×16, the encoding device may determine to apply BPBF to the current block. If the size of the current block is equal to or smaller than 16×16, the encoding device may determine not to apply BPBF to the current block.

The encoding device may generate a flag indicating whether to apply BPBF to the current block. This flag may be referred to as a BPBF flag. If BPBF is applied to the current block, the encoding device may generate an index indicating a prediction block to which a Wiener filter is applied among the first prediction block and the second prediction block of the current block, and this index may be referred to as a BPBF index.

The encoding device derives Wiener filter coefficients for the selected prediction block based on the first prediction block and the second prediction block (S820). The encoding device may derive a Wiener filter coefficient for the selected prediction block based on the first prediction block and the second prediction block of the current block. The encoding device may derive Wiener filter coefficients for the selected prediction block that minimize a residual signal between the selected prediction block and a prediction block other than the selected prediction block among the first prediction block and the second prediction block. The Wiener filter coefficients may be derived by Equation 1.

The encoding device filters the selected prediction block based on the derived Wiener filter coefficients (S830). The encoding device may generate a prediction block more similar to the prediction block other than the selected prediction block among the first prediction block and the second prediction block through filtering of the selected prediction block. Accordingly, it is possible to generate a filtered prediction block that is more similar to the reconstructed block, and it is possible to reduce the amount of data for the residual signal of the current block.

Furthermore, the encoding device may apply different shapes of Wiener filters in view of the change in the sample value of the current block or the characteristics of the current block. The characteristics of the current block may include the size of the current block and the shape of the current block.

For example, if the size of the current block is greater than 32×32 and the shape of the current block is square, the encoding device may derive a Wiener filter having a size of 7×5 or 5×7 for the current block. If the size of the current block is equal to or smaller than 32×32 and the shape of the current block is square, the encoding device may derive a Wiener filter having a size of 5×5 for the current block. If the size of the current block is equal to or smaller than 32×32 and the shape of the current block is non-square, the encoding device may derive a Wiener filter having a size of 5×3 or 3×5 for the current block.

The encoding device generates, encodes, and outputs prediction-related information and filtering information about the current block (S840). The encoding device may entropy-encode motion information about the first prediction block and the second prediction block of the current block and may output the motion information as a bitstream. Also, the encoding device may generate, a BPBF flag indicating whether BPBF is applied to the current block, may encode the BPBF flag, and may output the BPBF as a bitstream. Further, the encoding device may generate a BPBF index indicating a prediction block to which the Wiener filter is applied among the first prediction block and the second prediction block of the current block, may encode the BPBF index, and may output the BPFF index as a bitstream. The BPBF flag and the BPBF index may be transmitted through separate syntax elements or may be transmitted through a single syntax element. The bitstreams may be transmitted to a decoding device via a network or a storage medium.

Although not shown, the encoding device may encode and output information about a residual sample for the current block. The information about the residual sample may include transform coefficients about the residual sample.

Figure 9:
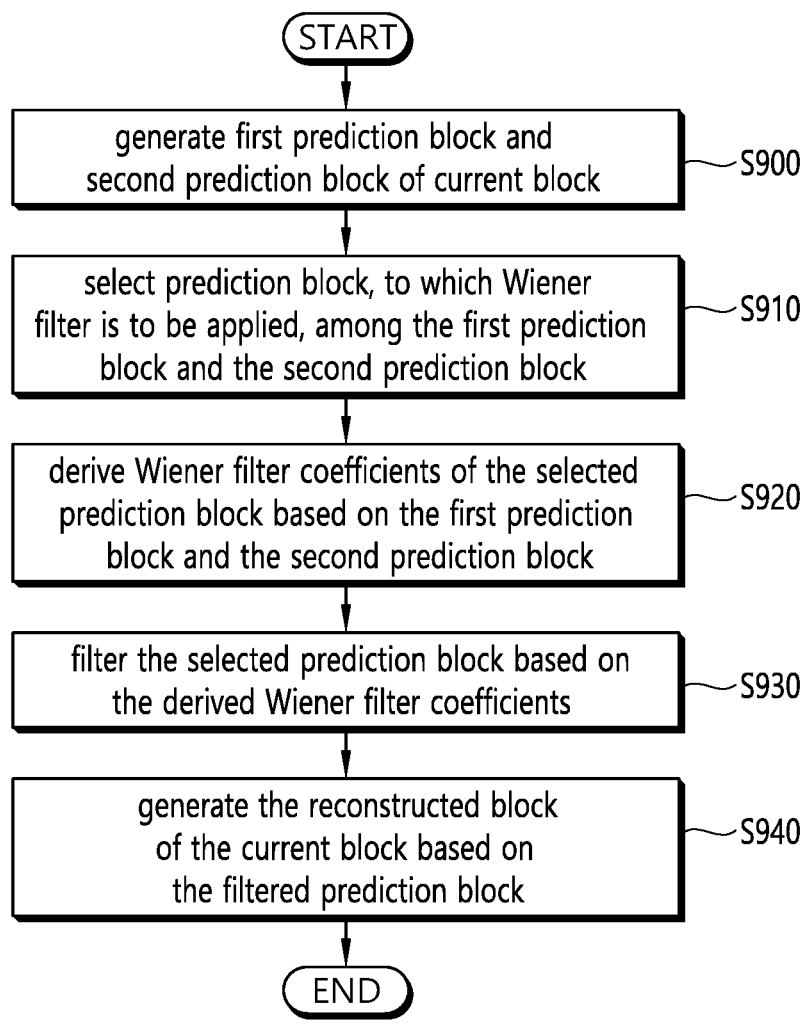
FIG. 9 schematically illustrates a video decoding method by a decoding device according to the present invention.

FIG. 9 schematically illustrates a video decoding method by a decoding device according to the present invention. The method disclosed in FIG. 9 may be performed by the decoding device disclosed in FIG. 2. For example, S900 in FIG. 9 may be performed by the predictor of the decoding device, S910 to S930 may be performed by the filter of the decoding device, and S940 may be performed by the adder of the decoding device.

The decoding device generates a first prediction block and a second prediction block of a current block (S900). The decoding device may derive a motion vector based on a merge index or a motion vector predictor (MVP) index for the current block, may find a reference block on a reference picture reconstructed based on the derived motion vector, and may generate a prediction block of the current block based on the reference block. The decoding device may obtain the merge index or the MVP index through a bitstream and may derive bi-predicted motion information about the current block based on the merge index or the MVP index. The bi-predicted motion information may include an L0 reference picture index indicating a reference picture included in reference picture list L0 (list 0), a motion vector associated with the reference picture included in L0, an L1 reference picture index indicating a reference picture included in reference picture list L1 (list 1), and a motion vector associated with the reference picture included in L1. The decoding device may generate the first prediction block and the second prediction block of the current block based on the bi-predicted motion information. The first prediction block may be generated by performing inter-prediction based on the reference picture included in reference picture list L0, and the second prediction block may be generated by performing inter-prediction based on the reference picture included in reference picture list L1.

The decoding device selects a prediction block to which a Wiener filter is applied from among the first prediction block and the second prediction block (S910). The decoding device may obtain a BPBF flag and a BPBF index of the current block through the bitstream. The BPBF flag may be a flag indicating whether BPBF is applied to the current block. The BPBF index may be an index indicating a prediction block to which the Wiener filter is applied among the first prediction block and the second prediction block of the current block. The BPBF flag and the BPBF index may be obtained through separate syntax elements or may be obtained through a single syntax element. The decoding device may derive a Wiener filter coefficient for one of the first prediction block and the second prediction block based on the first prediction block and the second prediction block and may filter the one prediction block based on the derived Wiener filter coefficient. This filtering may be referred to as bi-prediction block filtering (BPBF). The BPBF flag may indicate whether BPBF is applied to the current block. The decoding device may determine whether to filter one of the first prediction block and the second prediction block based on the BPBF flag. For example, if the value of the BPBF flag is 1, it may be determined that filtering is performed on one of the first prediction block and the second prediction block.

The prediction block to which the Wiener filter is applied may be derived based on the BPBF index from among the first prediction block and the second prediction block.

Also, the decoding device may select a prediction block to which the Wiener filter is applied based on information about a neighboring block of the current block, instead of obtaining the BPBF index through the bitstream.

For example, the decoding device may obtain prediction mode information, the merge index, and the BPBF flag for the current block through the bitstream, and if the prediction mode information is the skip mode or the merge mode, the decoding device may select a prediction block to which the Wiener filter is applied from among the first prediction block and the second prediction block based on information about a neighboring block of the current block, instead of obtaining the BPBF index through the bitstream.

For example, if the value of the BPBF flag is 1, the decoding device may derive a merge candidate list based on neighboring blocks of the current block and may select a prediction block to which the Wiener filter is applied from among the first prediction block and the second prediction block based on information about a neighboring block included in the merge candidate list. The prediction block to which the Wiener filter is applied may be selected from among the first prediction block and the second prediction block based on the BPBF index of the neighboring block indicated by the merge index.

If the value of the BPBF flag is 1, the decoding device may derive a neighboring block having a BPBF index value which is not 0 among merge candidate blocks included in the merge candidate list and may select, as a prediction block to which the Wiener filter is applied, a prediction block determined according to the value of the BPBF index of the neighboring block from among the first prediction block and the second prediction block.

If the value of the BPBF flag is 1, the decoding device may compare the value of the BPBF index of a left neighboring block of the current block in the merge candidate list with the value of the BPBF index of an upper neighboring block of the current block. If the value of the BPBF index of the left neighboring block is the same as the value of the BPBF index of the upper neighboring block, the decoding device may select, as a prediction block to which the Wiener filter is applied, a prediction block determined according to the value of the BPBF index of the left neighboring block from among the first prediction block and the second prediction block.

In another example, the decoding device may determine whether BPBF is applied to the current block based on the information about the neighboring block of the current block instead of obtaining the BPBF flag through the bitstream.

For example, the decoding device may obtain the merge index for the current block through the bitstream and may determine whether BPBF is applied to the current block based on the BPBF flag of the neighboring block of the current block included in the merge candidate list indicated by the merge index. Specifically, if the value of the BPBF flag of the neighboring block is 1, the decoding device may determine that filtering is performed on one of the first prediction blocks and the second prediction block.

Further, if there is at least one neighboring block having a BPBF flag value of 1 in the merge candidate list, the decoding device may determine that filtering is performed on one of the first prediction blocks and the second prediction block.

If the value of the BPBF flag of the left neighboring block of the current block among merge candidate blocks included in the merge candidate list is the same as the value of the BPBF flag of the upper neighboring block of the current block, the decoding device may determine whether filtering is performed on one of the first prediction block and the second prediction block based on the BPBF flag of the left neighboring block. Specifically, when the value of the BPBF flag of the left neighboring block in the merge candidate list is the same as the value of the BPBF flag of the upper neighboring block and the value of the BPBF flag of the left neighboring block is 1, the decoding device may determine that filtering is performed on one of the first prediction block and the second prediction block.

Also, the decoding device may determine whether BPBF is applied to the current block based on the sum of absolute differences (SAD) between samples of the first prediction block and the second prediction block according to the phase. Specifically, when the sum of absolute differences is greater than a specific threshold value, the decoding device may determine that filtering is not performed on one of the first prediction block and the second prediction block.

Further, the decoding device may determine whether to apply BPBF in samples in the current block according to the change in the sample value in samples. The decoding device may derive a first region of the first prediction block and may derive a second region of the second prediction block corresponding to the first region. The first region may be included in the first prediction block and may be a region with a specific size including a current sample for determining whether to apply BPBF. For example, the first region may be derived as a 5×5 region including the current sample. The decoding device may derive the sum of absolute differences between samples of the first region and the second region according to the phase and may determine whether to filter one of the first region and the second region based on the sum of absolute differences and a specific threshold value. If the sum of absolute differences is greater than the specific threshold value, the decoding device may determine not to perform filtering on one of the first region and the second region.

In addition, the decoding device may determine whether to apply BPBF to the current block in view of not only the change in the sample values of the first prediction block and the second prediction block but also various characteristics of a block. For example, if the size of the current block is greater than 16×16, the decoding device may determine to apply BPBF to the current block. If the size of the current block is equal to or smaller than 16×16, the decoding device may determine not to apply BPBF to the current block.

The decoding device derives Wiener filter coefficients for the selected prediction block based on the first prediction block and the second prediction block (S920). The decoding device may derive a Wiener filter coefficient for the selected prediction block based on the first prediction block and the second prediction block of the current block. The decoding device may derive Wiener filter coefficients for the selected prediction block that minimize a residual signal between the selected prediction block and a prediction block other than the selected prediction block among the first prediction block and the second prediction block. The Wiener filter coefficients may be derived by Equation 1.

The decoding device filters the selected prediction block based on the derived Wiener filter coefficients (S930). The decoding device may generate a prediction block more similar to the prediction block other than the selected prediction block among the first prediction block and the second prediction block through filtering of the selected prediction block. Accordingly, it is possible to generate a filtered prediction block that is more similar to the reconstructed block, and it is possible to reduce the amount of data for the residual signal of the current block.

Furthermore, the decoding device may apply different shapes of Wiener filters in view of the change in the sample value of the current block or the characteristics of the current block. The characteristics of the current block may include the size of the current block and the shape of the current block.

For example, if the size of the current block is greater than 32×32 and the shape of the current block is square, the decoding device may derive a Wiener filter having a size of 7×5 or 5×7 for the current block. If the size of the current block is equal to or smaller than 32×32 and the shape of the current block is square, the decoding device may derive a Wiener filter having a size of 5×5 for the current block. If the size of the current block is equal to or smaller than 32×32 and the shape of the current block is non-square, the decoding device may derive a Wiener filter having a size of 5×3 or 3×5 for the current block.

The decoding device generates a reconstructed block of the current block based on the filtered prediction block (S940). The decoding device may generate the reconstructed block of the current block based on the filtered prediction block. The decoding device may obtain a residual signal from the bitstream received from the encoding device and may generate a residual for the current block. In this case, the decoding device may generate the reconstructed block based on the filtered prediction block and the residual. The decoding device may generate a reconstructed picture based on the reconstructed block.

According to the present invention described above, it is possible to reduce the amount of data for a residual signal for a current block by minimizing the difference between prediction blocks derived based on bi-predicted motion information, thus improving overall coding efficiency.

Further, according to the present invention, since filtering information can be derived based on information about a neighboring block, additional information about filtering information can be reduced, thereby improving overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by an image decoding device, the method comprising:
   generating a first prediction block and a second prediction block of a current block;
   selecting a prediction block to which a Wiener filter is applied from among the first prediction block and the second prediction block;
   deriving Wiener filter coefficients for the selected prediction block based on the first prediction block and the second prediction block;
   filtering the selected prediction block based on the derived Wiener filter coefficients; and
   generating a reconstructed block of the current block based on the filtered prediction block,
   wherein the first prediction block is generated by performing inter-prediction based on a reference picture comprised in reference picture list L0 (list 0), and the second prediction block is generated by performing inter-prediction based on a reference picture comprised in reference picture list L1 (list 1),
   wherein the method further comprising:
   deriving a difference between samples of the first prediction block and the second prediction block according to a phase; and
   determining whether filtering is performed on one of the first prediction block and the second prediction block based on an absolute value of the difference and a specified threshold value,
   wherein when the absolute value of the difference is greater than the specified threshold value, filtering is not performed on one of the first prediction block and the second prediction block.

2. The method of claim 1, further comprising:
   obtaining a bi-prediction block filtering (BPBF) flag and a BPBF index of the current block through a bitstream; and
   determining whether filtering is performed on one of the first prediction block and the second prediction block based on the BPBF flag,
   wherein when the BPBF flag has a value of 1, it is determined that filtering is performed on one of the first prediction block and the second prediction block, and the prediction block to which the Wiener filter is applied is derived from the first prediction block and the second prediction block based on the BPBF index.

3. The method of claim 1, further comprising:
   obtaining prediction mode information, a merge index, and a BPBF flag of the current block through a bitstream;
   deriving a merge candidate list based on neighboring blocks of the current block when the prediction mode information indicates a skip mode or a merge mode; and
   selecting the prediction block to which the Wiener filter is applied from among the first prediction block and the second prediction block based on information about a neighboring block comprised in the merge candidate list when the BPBF flag has a value of 1.

4. The method of claim 3, wherein the prediction block to which the Wiener filter is applied is selected based on a BPBF index of the neighboring block indicated by the merge index among the neighboring blocks.

5. The method of claim 3, wherein the selecting of the prediction block to which the Wiener filter is applied from among the first prediction block and the second prediction block based on the information about the neighboring block comprised in the merge candidate list when the BPBF flag has a value of 1 comprises:
deriving the neighboring block having a BPBF index value that is not 0 among the neighboring blocks in the merge candidate list; and
selecting, as the prediction block to which the Wiener filter is applied, a prediction block determined according to the BPBF index value of the neighboring block from among the first prediction block and the second prediction block.

6. The method of claim 1, further comprising:
obtaining prediction mode information and a merge index of the current block through a bitstream;
deriving a merge candidate list based on neighboring blocks of the current block when the prediction mode information indicates a skip mode or a merge mode; and
determining whether filtering is performed on one of the first prediction block and the second prediction block based on information about a neighboring block comprised in the merge candidate list.

7. The method of claim 6, wherein when a BPBF flag of the neighboring block indicated by the merge index has a value of 1, it is determined that filtering is performed on one of the first prediction block and the second prediction block.

8. The method of claim 6, wherein when there is at least one neighboring block having a BPBF flag value of 1 in the merge candidate list, it is determined that filtering is performed on one of the first prediction block and the second prediction block.

9. The method of claim 1, further comprising:
deriving derive a first region of the first prediction block;
deriving a second region of the second prediction block corresponding to the first region;
deriving a sum of absolute differences (SAD) between samples of the first region and the second region according to a phase; and
determining whether filtering is performed on one of the first region and the second region based on the SAD and a specified threshold value,
wherein the SAD is greater than the specified threshold value, filtering is not performed on one of the first region and the second region.

10. The method of claim 1, wherein when the current block has a non-square shape, the Wiener filter has a non-square shape.

11. An image decoding apparatus that performs image decoding, the apparatus comprising:
a predictor configured to generate a first prediction block and a second prediction block of a current block;
a filter configured to select a prediction block to which a Wiener filter is applied from among the first prediction block and the second prediction block, to derive Wiener filter coefficients for the selected prediction block based on the first prediction block and the second prediction block, and to filter the selected prediction block based on the derived Wiener filter coefficients; and
an adder configured to generate a reconstructed block of the current block based on the filtered prediction block,
wherein the first prediction block is generated by performing inter-prediction based on a reference picture comprised in reference picture list L0 (list 0), and the second prediction block is generated by performing inter-prediction based on a reference picture comprised in reference picture list L1 (list 1),
and the apparatus further comprising:
a decision unit configured to derive a difference between samples of the first prediction block and the second prediction block according to a phase, and to determine whether filtering is performed on one of the first prediction block and the second prediction block based on an absolute value of the difference and a specified threshold value,
wherein when the absolute value of the difference is greater than the specified threshold value, filtering is not performed on one of the first prediction block and the second prediction block.

12. The apparatus of claim 11, further comprising:
an entropy decoder configured to obtain a bi-prediction block filtering (BPBF) flag and a BPBF index of the current block through a bitstream,
wherein the predictor selects the prediction block to which the Wiener filter is applied from among the first prediction block and the second prediction block based on the BPBF flag.

13. The apparatus of claim 11, further comprising:
an entropy decoder configured to obtain prediction mode information, a merge index, and a BPBF flag of the current block through a bitstream,
wherein the filter derives a merge candidate list based on neighboring blocks of the current block when the prediction mode information indicates a skip mode or a merge mode, and selects the prediction block to which the Wiener filter is applied from among the first prediction block and the second prediction block based on information about a neighboring block comprised in the merge candidate list when the BPBF flag has a value of 1.

14. The apparatus of claim 11, further comprising:
an entropy decoder configured to obtain prediction mode information and a merge index of the current block through a bitstream,
wherein the filter derives a merge candidate list based on neighboring blocks of the current block when the prediction mode information indicates a skip mode or a merge mode, and determines whether filtering is performed on one of the first prediction block and the second prediction block based on information about a neighboring block comprised in the merge candidate list.

* * * * *